US012478222B2

(12) United States Patent
Fischer

(10) Patent No.: US 12,478,222 B2
(45) Date of Patent: Nov. 25, 2025

(54) MULTIFUNCTIONAL DISPENSER FOR DISPENSING CLEANING-ACTIVE LIQUIDS

(71) Applicant: MERCEDES-BENZ GROUP AG, Stuttgart (DE)

(72) Inventor: Jan Fischer, Tuebingen (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 376 days.

(21) Appl. No.: 18/029,743

(22) PCT Filed: Sep. 29, 2021

(86) PCT No.: PCT/EP2021/076798
§ 371 (c)(1),
(2) Date: Mar. 31, 2023

(87) PCT Pub. No.: WO2022/073822
PCT Pub. Date: Apr. 14, 2022

(65) Prior Publication Data
US 2023/0380639 A1   Nov. 30, 2023

(30) Foreign Application Priority Data

Oct. 5, 2020   (DE) .................... 10 2020 006 088.9

(51) Int. Cl.
*A47K 5/12*      (2006.01)
*A47K 10/32*   (2006.01)
(Continued)

(52) U.S. Cl.
CPC ..................... *A47K 5/12* (2013.01);
*A61L 2/18* (2013.01); *A61L 2/26* (2013.01);
*B05B 11/0038* (2018.08);
(Continued)

(58) Field of Classification Search
CPC ....... A47K 5/12; B05B 11/0038; B05B 11/10; A61L 2/18; A61L 2/26; B60R 11/00
See application file for complete search history.

(56) References Cited

U.S. PATENT DOCUMENTS 5,372,652 A * 12/1994 Srikrishnan ....... H01L 21/67028
134/21
8,371,479 B2   2/2013 Luft
(Continued)

FOREIGN PATENT DOCUMENTS

CN       210931075 U    7/2020
DE        3744438 A1    7/1989
(Continued)

OTHER PUBLICATIONS

Machine translation of JP-2014234217-A.*
(Continued)

*Primary Examiner* — Jeremy Carroll
(74) *Attorney, Agent, or Firm* — PATENT PORTFOLIO BUILDERS PLLC

(57) ABSTRACT

A multifunctional dispenser for dispensing cleaning-active liquids includes a housing having a first pot-shaped housing part suitable for receiving medical products and, arranged thereon, a second pot-shaped housing part suitable for receiving cleaning-active liquids. The first housing part defines a first central axis, has a loading passage for passing medical products therethrough, and stores a medical product. The second housing part defines a second central axis and stores cleaning-active liquid. The multifunctional dispenser also includes an actuatable liquid dispenser for dispensing cleaning-active liquids defining a dispenser central axis. Actuation of the liquid dispenser delivers a predefined volume or mass of cleaning-active liquid from the second housing part and either introduces it into the first housing part in order to wet the medical product arranged
(Continued)

Figure 1:
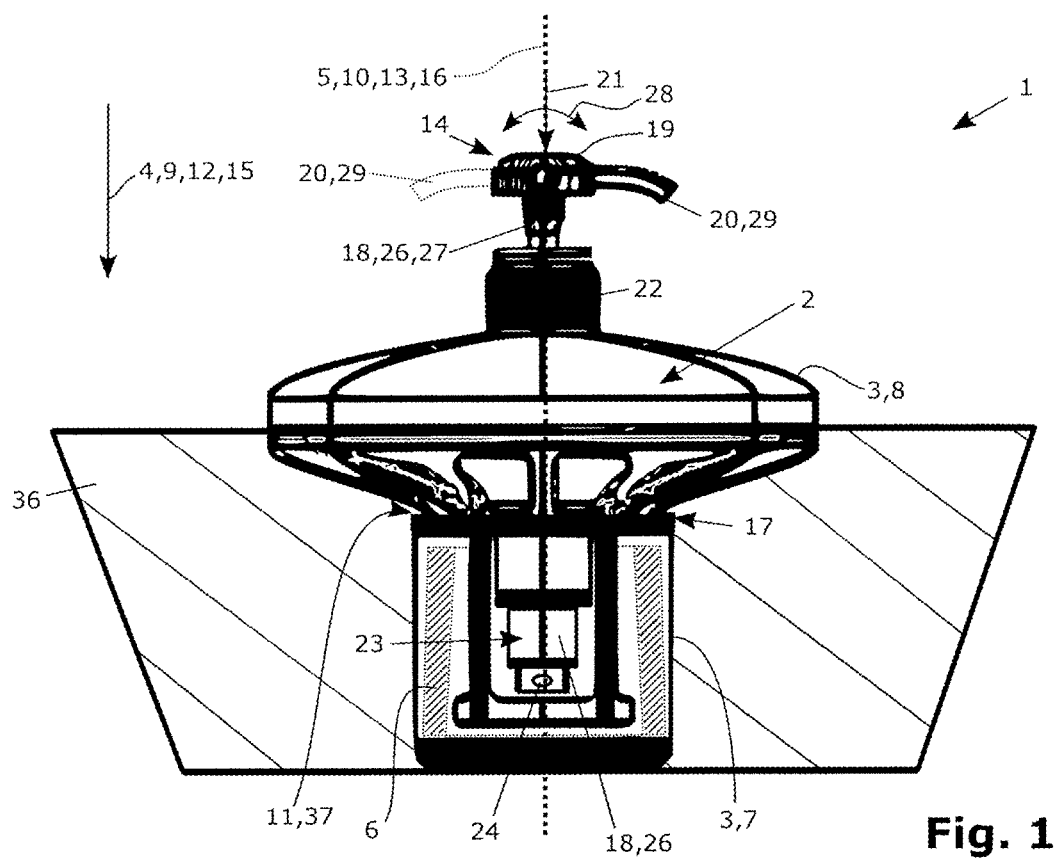

therein or dispenses it to a user. The dispenser central axis, the first central axis, and the second central axis are aligned coaxially with each other.

9 Claims, 3 Drawing Sheets

(51) Int. Cl.
*A47K 10/38* (2006.01)
*A61L 2/18* (2006.01)
*A61L 2/26* (2006.01)
*B05B 11/00* (2023.01)
*B05B 11/10* (2023.01)
*B60R 11/00* (2006.01)

(52) U.S. Cl.
CPC ............ *B05B 11/10* (2023.01); *B60R 11/00* (2013.01); *A47K 2010/3233* (2013.01); *A47K 2010/389* (2013.01); *A61L 2202/122* (2013.01); *A61L 2202/15* (2013.01); *A61L 2202/16* (2013.01); *A61L 2202/18* (2013.01); *A61L 2202/24* (2013.01); *A61L 2202/26* (2013.01); *B60R 2011/0007* (2013.01)

(56) References Cited

U.S. PATENT DOCUMENTS

| | | | |
|---|---|---|---|
| 8,517,171 B1 * | 8/2013 | Delgado | B65D 21/0231 |
| | | | 206/38.1 |
| 9,975,660 B2 | 5/2018 | Cartledge et al. | |
| 2017/0233136 A1 * | 8/2017 | Cartledge | B65D 21/0228 |
| | | | 222/130 |
| 2021/0100406 A1 * | 4/2021 | Gage | A47K 5/1217 |

FOREIGN PATENT DOCUMENTS

| | | | |
|---|---|---|---|
| GB | 2525457 A | | 10/2015 |
| JP | 2014234217 A | * | 12/2014 |
| WO | 0142117 A1 | | 6/2001 |

OTHER PUBLICATIONS

International Search Report and Written Opinion mailed Jan. 4, 2022 in related/corresponding International Application No. PCT/EP2021/076798.
Office Action created Jun. 30, 2021 in related/corresponding DE application No. 10 2020 006 088.9.
Office Action dated Feb. 28, 2025 in related/corresponding CN application No. 202180068270.4.

* cited by examiner

MULTIFUNCTIONAL DISPENSER FOR DISPENSING CLEANING-ACTIVE LIQUIDS

BACKGROUND AND SUMMARY OF THE INVENTION

Exemplary embodiments of the invention relate to a multifunctional dispenser for dispensing cleaning-active liquids.

DE 37 44 438 A1 discloses a multifunctional dispenser consisting of a closed first housing part for wipes, nonwovens and paper and, molded integrally thereon on the longitudinal side, a second housing part, which can be closed separately, for liquids, powder or pastes, and a liquid dispenser for these agents. A disadvantage of this multifunctional dispenser is that the first and second housing parts are relatively large, which makes the known multifunctional dispenser relatively bulky.

Exemplary embodiments of the invention are therefore directed to an improved or at least another embodiment of a multifunctional dispenser. In particular, an attempt shall be made to provide a comparatively compact multifunctional dispenser.

The underlying concept of the invention is to stack the first and second housing part and also the multifunctional dispenser on top of one another, whereby the proposed multifunctional dispenser is relatively compact and space-saving.

For this purpose, provision is made of a multifunctional dispenser for dispensing cleaning-active liquids, having a multi-part housing extending in a main direction of extension, i.e., along a straight central axis, and has an integral, first pot-shaped housing part suitable for receiving medical products and, arranged in contact thereon, i.e., on the first housing part, an integral, second pot-shaped housing part suitable for receiving cleaning-active liquids. Cleaning-active liquids can be, for example, disinfectants or soaps or fragrance substances. According to the understanding of the invention, cleaning-active liquids can be in liquid, powder, or paste form. Medical products are expediently hygiene products such as face masks, tissues, cleaning agents or disinfectants. In any case, the first housing part defines a straight first central axis in its main direction of extension and has a loading passage for passing medical products therethrough. At least one medical product is inserted through the loading passage into the first housing part. The second housing part defines a second central axis in its main direction of extension and stores cleaning-active liquid. The multifunctional dispenser further preferably has a manually actuatable liquid dispenser for dispensing cleaning-active liquids. This in turn defines a straight dispenser central axis in its main direction of extension. When the multifunctional dispenser is, in particular manually, actuated a predefined volume or a predefined mass of cleaning-active liquid is delivered from the second housing part and dispensed, in particular towards the outside of the housing. It is essential to the invention that the dispenser central axis, the first central axis and the second central axis are aligned coaxially with each other. As a result, the component parts of the multifunctional dispenser lie on a common line with regards to their respective axes, which makes it possible to realize a compact design of the multifunctional dispenser. This is particularly advantageous when the first housing part and the second part are rotationally symmetrical with respect to their respective axes. Furthermore, the liquid dispenser can be fixed either to the first housing part and/or to the second housing part, so that all of the component parts of the liquid dispenser form a structural unit.

Expediently, the first housing part and the second part can be detachably arranged on each other. By way of example, this can be realized by a screw connection, a snap-action connection, a quick-action fastener, or a clamp connection between the first housing part and the second housing part. This has the effect that the two separate housing parts can be detached from each other in a non-destructive manner and can be reattached to each other without further tools.

Furthermore, particularly when manually actuated, the liquid dispenser delivers a predefined volume or a predefined mass of cleaning-active liquid from the second housing part and does not just dispense it, but either introduces it into the first housing part in order to wet the at least one medical product arranged therein or dispenses it, in particular towards the outside of the housing. The liquid dispenser expediently has a round-cylindrical dispenser shaft extending along the dispenser central axis for passing cleaning-active liquids therethrough, wherein a knob-shaped dispenser head of the liquid dispenser that is accessible from the outside, in particular from outside the housing, is arranged at one end on the dispenser shaft, in particular at the free end of the dispenser shaft, from which dispenser head an internally hollow dispenser spout in fluidic communication with the dispenser shaft and projecting away at an angle, in particular a right angle, with respect to the dispenser central axis is arranged for dispensing cleaning-active liquids. The dispenser shaft penetrates the first housing part and the second housing part at least in sections in each case. The term "knob-shaped" expediently describes a spherical, ovoid, or button-shaped body. Furthermore, an actuation force, in particular aligned parallel to the dispenser central axis, can be introduced at the dispenser head to actuate the liquid dispenser, e.g., manually by hand, so that cleaning-active liquid can be delivered or pumped from the second housing part through the dispenser shaft to the dispenser spout. First of all, this has the advantage that the liquid dispenser can be used with relative convenience by a user. Furthermore, altogether, a multifunctional dispenser is thereby provided which, on the one hand, can dispense a cleaning-active liquid, in particular disinfectant or soap, to a user, and which, on the other hand, can wet and/or fragrance a medical product inserted into the multifunctional dispenser, in particular hygiene products such as face masks, tissues, cleaning agents or disinfectants, with the same liquid. This has the advantage of providing a dual function, eliminating the need for two separate devices, each implementing a function.

A bellows can expediently be arranged between the dispenser head of the liquid dispenser and the housing, which creases to form several peaks in the direction of the dispenser central axis. The bellows can be loosely applied, or fixed, in touching contact at one end to the first or second housing part and at the other end to the dispenser head.

Further expediently, the liquid dispenser can be fixed in contact with the first housing part, wherein the dispenser shaft penetrates the first housing part completely and the second housing part in sections. Alternatively, the liquid dispenser can be fixed in contact with the second housing part, wherein the dispenser shaft penetrates the first housing part in sections and the second housing part completely. In particular, it can be provided that the dispenser head of the liquid dispenser is located in an exposed position that is easily accessible to a user, whereby the first housing part and then the second housing part follow the dispenser head in the direction of the dispenser central axis. Alternatively, it can also be provided that the dispenser head of the liquid dispenser is located in an exposed position that is easily accessible to a user, whereby firstly the second housing part and then the first housing part are connected to the dispenser head in the direction of the dispenser central axis. In other words, the first and second housing parts can also be arranged in reverse order in the direction of the dispenser central axis. This has the advantage that the proposed multifunctional dispenser can be adapted relatively flexibly to a wide variety of installation situations, for example in the center console of a motor vehicle.

Expediently, the liquid dispenser can have a housing-internal disinfectant dispensing section arranged inside the first housing part for introducing cleaning-active liquids into the first housing part in order to wet the at least one medical product arranged in the first housing part. The disinfectant dispensing section can be arranged on the dispenser shaft. In particular, a knob-shaped dispenser head of the liquid dispenser, which is accessible from outside the housing, can be arranged at one end on the free end of the dispenser shaft and in the middle, e.g., halfway along the dispenser shaft, on the dispenser shaft of the disinfectant dispensing section. This has the advantageous effect that when an actuation force is applied to the dispenser head to actuate the liquid dispenser, e.g., manually by hand, cleaning-active liquid can be delivered or pumped from the second housing part through the dispenser shaft to the disinfectant dispensing section or to the dispenser spout. This means that medical products arranged in the first housing part can be wetted with cleaning-active liquid and thus disinfected, for example. This has the advantage that corresponding medical products can be wetted or disinfected relatively easily by a user by means of the liquid dispenser.

Furthermore, the disinfectant dispensing section can be formed from a group of orifices having a plurality of spray orifices. The dispenser shaft of the liquid dispenser can expediently have a hollow-cylindrical circular tubular body, on the material tubular jacket of which, not to be equated with its lateral surface, the spray orifices of the group of orifices are arranged or formed. It can be expedient if the spray orifices are each arranged in the direction of the dispenser central axis with identical longitudinal spacing from one another and in a circumferential direction rotating about the dispenser central axis with identical circumferential spacing from one another. This ensures that the medical products inserted into the multifunctional dispenser can be wetted evenly and fully, in particular over their entire surface, with cleaning-active liquids.

Expediently, the loading passage, in particular in the assembled state thereof, can be axially arranged in the direction of the first central axis and of the second central axis between the first housing part and the second housing part and can be or is closed by the second housing part, in particular in a fluid-tight manner and/or completely. As a result, the first housing part receiving the medical products is or can be closed by the second housing part so that the medical products are captively stored in the first housing part. This has the advantage that the medical products do not get lost and that a separate lid for covering the first housing part can be dispensed with. This makes the multifunctional dispenser lightweight and, due to the resulting relatively low number of components overall, cost-effective.

Further expediently, the dispenser head of the liquid dispenser is rotatably, especially manually, arranged on the dispenser shaft and can be rotated back and forth around the dispenser central axis between exactly two, exactly three, or at least three different rotational positions. The liquid dispenser cannot be actuated in the direction of the dispenser central axis when the dispenser head is rotated into a first one of these rotational positions, referred to as locked position, in which the dispenser head defines a reference angle position, in particular of 0° for example, but is locked, so that the liquid dispenser cannot be used either to introduce cleaning-active liquid via the disinfectant dispensing section into the first housing part or to dispense it via the dispenser spout. Further, the liquid dispenser can be actuated in the direction of the dispenser central axis by applying actuation force, for example manually by hand, to the dispenser head when the dispenser head is rotated into a second of these rotational positions, referred to as dispensing position, in which the dispenser head defines a dispensing angle position that deviates in the angular range of +10° to +90° with respect to the reference angle position, so that the liquid dispenser is used to deliver, in particular pump, cleaning-active liquid through the dispenser shaft and dispense it via the dispenser spout, for example onto a hand of the user. If three or at least three rotational positions are provided, the liquid dispenser can be actuated in the direction of the dispenser central axis by applying actuation force, for example manually by hand, to the dispenser head when the dispenser head is rotated into a third of these rotational positions, referred to as wetting position, in which the dispenser head defines a wetting angle position that deviates in the angular range of −10° to −90° with respect to the reference angle position, so that the liquid dispenser can be used to pass cleaning-active liquid from the second housing part through the dispenser shaft of the liquid dispenser to the disinfectant dispensing section and to wet the at least one medical product arranged in the first housing part. A multifunctional dispenser is thereby also provided which, on the one hand, can dispense a cleaning-active liquid, in particular disinfectant or soap, for example to a user, and which, on the other hand, can wet and/or fragrance a medical product inserted into the multifunctional dispenser, in particular hygiene products such as face masks, tissues, cleaning agents, or disinfectants, with the same liquid. The dispenser head can, for example, be manually switched back and forth between the rotational positions. This has the advantage that a conveniently controlled dual function is provided.

Furthermore, the first housing part and/or the second housing part can be integrated into a center console of a motor vehicle. This means that the multifunctional dispenser can be easily integrated into a motor vehicle and positioned in the latter so as to be conveniently accessible to the motor vehicle user.

Expediently, a basket or a grid for collecting and gripping the at least one medical product can be arranged in the interior of the first housing part. Furthermore, each of the spray orifices of the group of orifices can be formed by an atomizer. Further, the loading passage can have or form a round passage suitable for the manual insertion and manual removal of at least one medical product into/from the first housing part. It can also be provided that the loading passage has or forms a slotted, in particular slotted in the form of a cross or star, dispensing device or a single-slot passage, each of which are suitable for passing therethrough and dispensing at least one medical product stored in the first housing part.

In summary, the following can be said: the present invention preferably relates to a multifunctional dispenser for dispensing cleaning-active liquids, having a housing which has a first pot-shaped housing part suitable for receiving medical products and, arranged thereon, a second pot-shaped housing part suitable for receiving cleaning-active liquids. The first housing part defines a first central axis, has a loading passage for passing medical products therethrough, and stores at least one medical product which is inserted through the loading passage into the first housing part. The second housing part defines a second central axis and stores cleaning-active liquid. The multifunctional dispenser is further equipped with an actuatable liquid dispenser for dispensing cleaning-active liquids which defines a dispenser central axis. It is essential to the invention that the liquid dispenser, when actuated, delivers a predefined volume or a predefined mass of cleaning-active liquid from the second housing part and either introduces it into the first housing part in order to wet the at least one medical product arranged therein or dispenses it to a user. The dispenser central axis, the first central axis and the second central axis are aligned coaxially with each other.

Further important features and advantages of the invention result from the subclaims, from the drawings and from the associated description of the figures on the basis of the drawings.

It goes without saying that the abovementioned features and those still to be elucidated further below can be used not only in the respectively given combination, but also in other combinations, or in isolation, without departing from the scope of the present invention.

BRIEF DESCRIPTION OF THE DRAWING FIGURES

Preferred exemplary embodiments of the invention are shown in the drawings and are explained in more detail in the following description, with the identical reference signs relating to identical or similar or functionally identical components.

Figure 2:
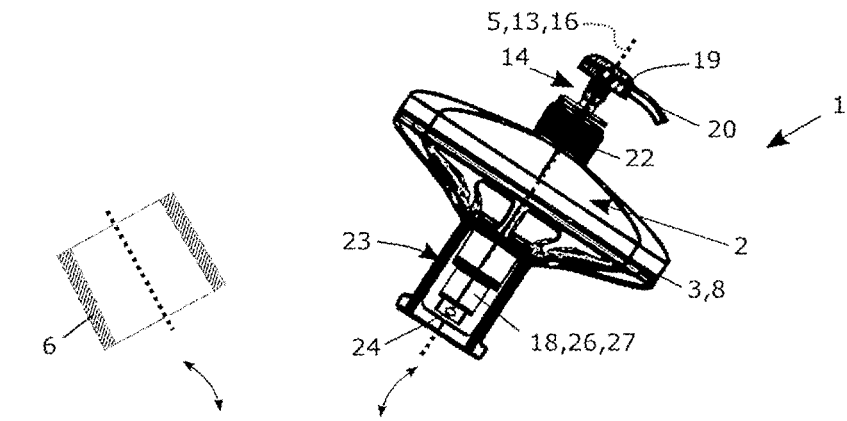
Figure 2:
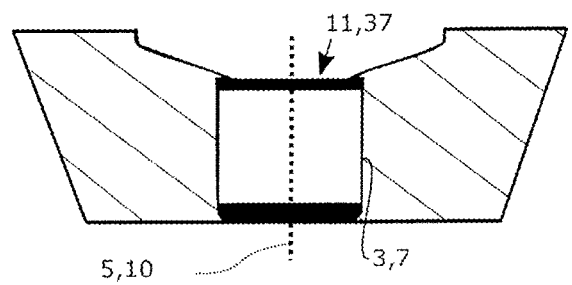
Figure 3:
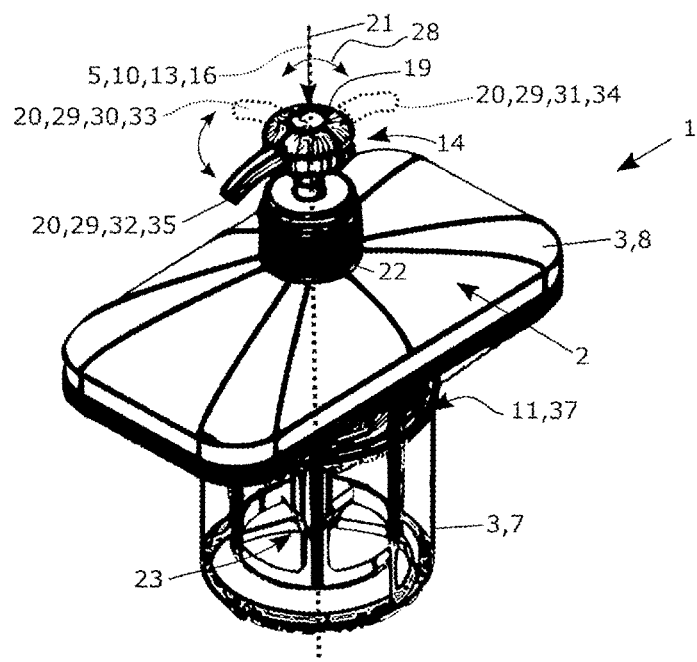
Figure 4:
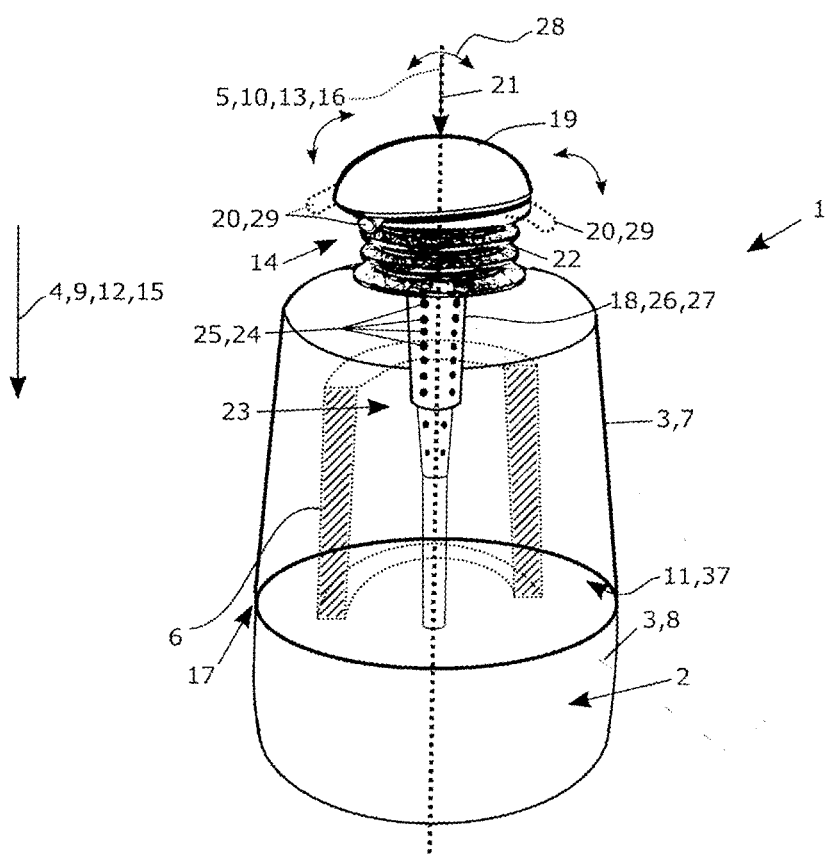
Figure 5:
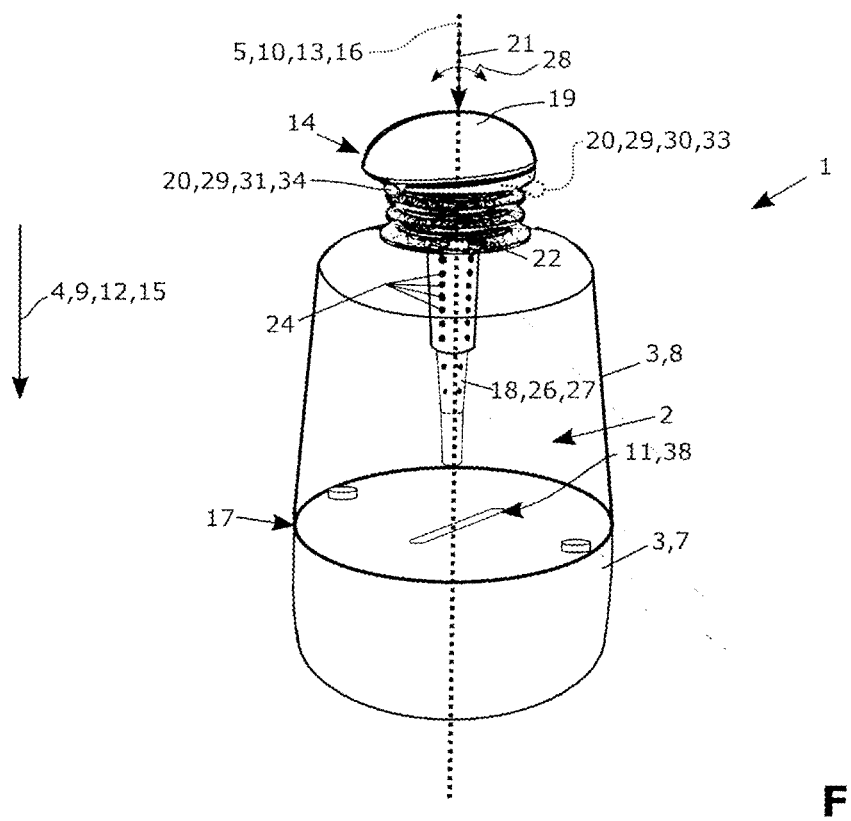
Figure 6:
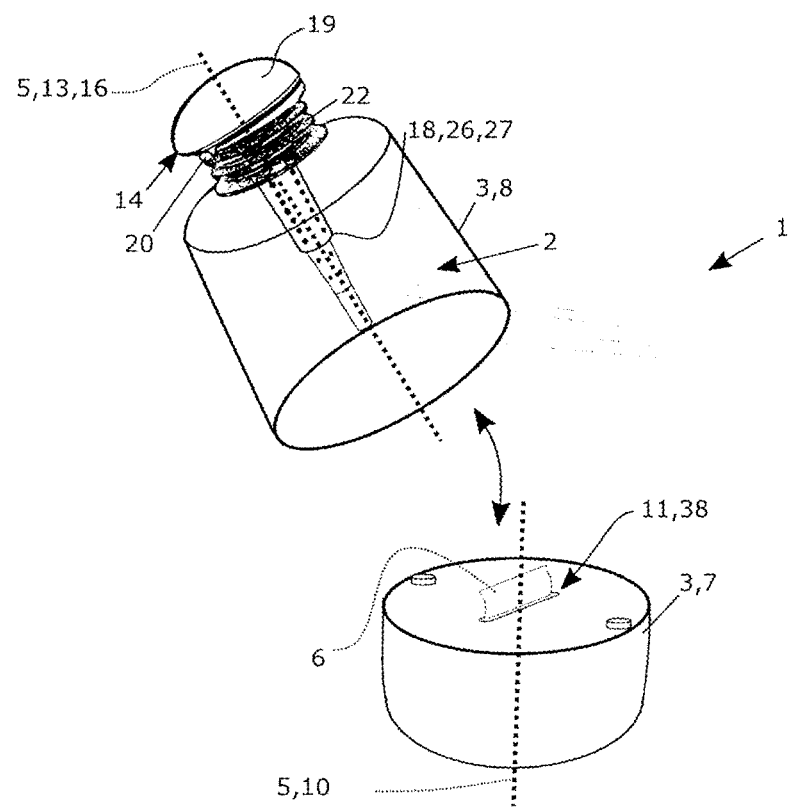

The figures each schematically show:

FIG. 1 a partial sectional view of a preferred exemplary embodiment of a multifunctional dispenser according to the invention, FIG. 2 a further partial sectional view of the multifunctional dispenser from FIG. 1, however the two housing parts of the multifunctional dispenser are now arranged spaced apart from each other so that a medical product can be removed from or inserted into the first housing part, FIG. 3 a perspective view of the multifunctional dispenser from FIG. 1, with three rotational positions of the dispenser head of the liquid dispenser being illustrated by way of example, further FIG. 4 a perspective view of a preferred further exemplary embodiment of a multifunctional dispenser according to the invention, furthermore FIG. 5 a perspective view of a preferred further exemplary embodiment of a multifunctional dispenser according to the invention, and lastly FIG. 6 a perspective view of the multifunctional dispenser from FIG. 5, however the two housing parts of the multifunctional dispenser are now arranged spaced apart from each other so that a medical product can be removed from the first housing part.

DETAILED DESCRIPTION

FIGS. 1 to 6 show a multifunctional dispenser, designated as a whole by the reference sign 1, which serves to dispense cleaning-active liquids 2. Such cleaning-active liquids 2 are, for example, disinfectants or soaps or fragrance substances which, by way of example, can be present in liquid, powder or paste form and all of which provide a cleansing and/or disinfecting and/or fragrancing effect.

FIGS. 1 to 3 show a preferred first exemplary embodiment of a multifunctional dispenser 1 according to the invention, which, by way of example, is integrated into a center console 36 of a motor vehicle. A center console 36 of a motor vehicle (not illustrated) can be seen in FIG. 1 that has been cut open lengthwise and the cut faces of which are shown hatched. The center console 36 provides a recess for receiving the multifunctional dispenser 1, into which a single multifunctional dispenser 1 is inserted with touching contact and fixed, for example by clamping, screwing, or adhesive bonding, in order to ensure a firm hold and freedom from vibration during operation of the motor vehicle.

The multifunctional dispenser 1 for dispensing cleaning-active liquids 2 according to FIGS. 1 to 3 has a multi-part housing 3 extending, by way of example, in a main direction of extension 4 along a straight central axis 5. The multi-part housing 3 has an integral, first pot-shaped housing part 7 suitable for receiving medical products 6, such as face masks, tissues, cleaning agents, or disinfectants, and, arranged in contact thereon, an integral, second pot-shaped housing part 8 suitable for receiving cleaning-active liquids 2. The first housing part 7, produced in particular from plastic, defines a straight first central axis 10 in its main direction of extension 9 and has a loading passage 11 for guiding medical products 6 through; as an example it is a round passage 37. According to FIG. 1, by way of example, a single medical product 6 is inserted into the interior of the first housing part 7. It can further be seen in FIGS. 1 and 2 that the first housing part 7 is integrally incorporated into the center console 36 or arranged thereon, which facilitates the integration of the multifunctional dispenser 1 into a motor vehicle and makes it conveniently accessible to a user. The second housing part 8, also produced in particular from plastic, defines a straight second central axis 13 in its main direction of extension 12 and stores a predefined volume or a predefined mass of cleaning-active liquid 2 in its interior. By way of example, the loading passage 11, in particular in its installed state, is axially arranged between the first housing part 7 and the second housing part 8 in the direction of the first central axis 10 and the second central axis 13 and is designed to be able to be closed in a fluid-tight manner by the second housing part 8. In other words, the second housing part 8 acts as a lid for closing the loading passage 11 of the first housing part 7.

As indicated in FIG. 2, the second housing part 8 can be taken off the first housing part 7 in order to take the medical product 6 out of the first housing part 7 or insert it into the latter. In FIGS. 1 to 3, by way of example, the first housing part 7 and the second housing part 8 are arranged so as to be detachably in contact with each other by means of a screw connection 17, which provides the advantageous option of detaching the two separate housing parts 7, 8 from each other in a non-destructive manner and reattaching them to each other.

The multifunctional dispenser 1 according to FIGS. 1 to 3 also has a manually actuatable liquid dispenser 14 which is arranged, e.g., screwed or integrally molded, on the second housing part 8 and serves for dispensing cleaning-active liquids 2. It defines a dispenser central axis 16 in its main direction of extension 15. When the liquid dispenser 14 is actuated, for example by applying, in particular manually by hand, an actuation force 21 (indicated by an arrow in FIG. 1) to the liquid dispenser 14, a predefined volume or a predefined mass of cleaning-active liquid 2 is delivered, in particular pumped, from the interior of the second housing part 8 and is either introduced into the first housing part 7 in order to wet the medical product 6 arranged therein or is dispensed to the outside to the user. A multifunctional dispenser 1 is thereby provided overall that can dispense a cleaning-active liquid 2 to a user and can use this same liquid 2 to wet and/or fragrance a medical product 6 inserted inside the multifunctional dispenser 1. In order to make the design of the multifunctional dispenser 1 compact, the central axis 5, the dispenser central axis 16, the first central axis 10, and the second central axis 13 are aligned parallel and coaxial to each other, for example. As a result, the component parts of the multifunctional dispenser 1 lie on a common line with respect to their respective axes and are parallel. This is particularly advantageous when the first housing part 7 and the second housing part 8 are rotationally symmetrical with respect to their respective axes.

It can be further seen in FIGS. 1 to 3 that the liquid dispenser 14 has a continuous round-cylindrical dispenser shaft 18 extending along the dispenser central axis 16 for passing cleaning-active liquid 2 therethrough. By way of example, the dispenser shaft 18 has a hollow-round-cylindrical circular tubular body 26, which has a material tubular jacket 27 with a rotating lateral surface. The dispenser shaft 18 passes through the first housing part 7 in sections and completely through the second housing part 8. At one end of the dispenser shaft 18 there is arranged a knob-shaped dispenser head 19 that is accessible to the user from the outside of the housing and to which the actuation force 21 can be expediently applied for pump actuation of the liquid dispenser 14. A dispenser spout 20 is integrally molded on the dispenser head 19, which dispenser spout is in fluidic communication with the dispenser shaft 18, projects away an angle, in particular at right angles, with respect to the dispenser central axis 16 and serves to dispense cleaning-active liquids 2 when the liquid dispenser 14 is actuated, in particular with the actuation force 21. By way of example, a bellows 22, which creases to form several peaks in the direction of the dispenser central axis 16, is arranged between the dispenser head 19 and the second housing part 8, in the direction of the dispenser central axis 16. In addition, the liquid dispenser 14 has a disinfectant dispensing section 23 arranged internal to the housing inside the first housing part 7 and facing the medical product 6 for introducing cleaning-active liquids 2 into the first housing part 7 in order to wet the medical product 6 arranged in the first housing part 7. The disinfectant dispensing section 23 can be integrally formed on the dispenser shaft 18 and arranged in the middle or at the other end on the dispenser shaft 18. Thus, when the actuation force 21 is applied to the dispenser head 19, it is possible to actuate the liquid dispenser 14, whereby cleaning-active liquid 2 is delivered or pumped from the interior of the second housing part 7 through the dispenser shaft 18 to the disinfectant dispensing section 23 or to the dispenser spout 20. As a result, medical products 6 arranged in the first housing part 7 can be wetted with cleaning-active liquid 2 and disinfected, for example. It can also be seen in FIGS. 1 and 2 that the disinfectant dispensing section 23 is formed by a single spray orifice 24 arranged on the tubular jacket 27 of the dispenser shaft 18. More than one spray orifice 24 is of course also conceivable. The spray orifice 24 can be formed by an atomizer.

Finally, FIG. 3 shows the multifunctional dispenser 1 in a perspective view, so that it can be seen by way of example that the dispenser head 19 together with the dispenser spout 20 can be rotated back and forth, for example manually by hand, between three angularly deviating rotational positions 29 in a circumferential direction 28 rotating around the dispenser central axis 16. For this purpose, the dispenser head 19 is rotatably arranged on the dispenser shaft 18 or on the first or second housing part 7, 8. In FIG. 3 it is indicated that when the dispenser head 19 is rotated into the illustrated first one of these rotational positions 29, referred to as locked position 30, the liquid dispenser 14 cannot be actuated, but is blocked against movement in the direction of the dispenser central axis 16. As a result, the liquid dispenser 14 can neither introduce cleaning-active liquid 2 into the first housing part 7 via the disinfectant dispensing section 23 nor dispense it to the user via the dispenser spout 20. In this rotational position 29, the dispenser head 19 defines a reference angle position 33, in particular, for example, of 0°.

It is further indicated in FIG. 3 by dotted lines that when the dispenser head 19 is rotated into a second one of these rotational positions 29, referred to as dispensing position 31, the liquid dispenser 14 can be actuated in the direction of the dispenser central axis 16 by applying actuation force 21 to the dispenser head 19 in the direction of the dispenser central axis 16. As a result, a certain mass or a certain volume of cleaning-active liquid 2 can be delivered, in particular pumped, through the dispenser shaft 18 by means of the liquid dispenser 14 and dispensed to a user via the dispenser spout 20. In this rotational position 29, the dispenser head 19 defines a so-called dispensing angle position 34, which is angularly rotated with respect to the reference angle position 33 in the angular range of +10° to +90°.

It is also indicated in FIG. 3 that when the dispenser head 19 is rotated into a third one of these rotational positions 29, referred to as wetting position 32, the liquid dispenser 14 can be actuated in the direction of the dispenser central axis 16 by applying actuation force 21 to the dispenser head 19 in the direction of the dispenser central axis 16. As a result, by means of the liquid dispenser 14, cleaning-active liquid 2 can be passed from the second housing part 8 through the dispenser shaft 18 of the liquid dispenser 14 to the disinfectant dispensing section 23 in order to ultimately wet a medical product 6 arranged in the first housing part 7 the cleaning-active liquid 2 with the aid of the spray orifice 24. In this rotational position 29, the dispenser head 19 defines a so-called wetting angle position 35, which is angularly rotated with respect to the reference angle position 33 in the angular range of –10° to –90°. A cleaning-active liquid 2 can thereby, on the one hand, be dispensed to a user and, on the other hand, this same liquid 2 can be used to wet and/or fragrance a medical product 6 inserted into the multifunctional dispenser 1.

FIG. 4 shows a perspective view of a preferred further exemplary embodiment of a multifunctional dispenser 1 according to the invention. This differs from the multifunctional dispenser 1 according to the preceding exemplary embodiment in that the liquid dispenser 14 is now no longer arranged on the second housing part 8 but on the first housing part 7, and in that its dispenser shaft 18 extends through the first housing part 7 completely and the second housing part 8 in sections. In any case, the above function of the liquid dispenser 14 is essentially unchanged, in particular the dispenser head 19 there can also be actuated into the three rotational positions 29. On the disinfectant dispensing section 23 of the dispenser shaft 18, which is located on the inside of the first housing part 7 and faces the medical product 6, there are now spray orifices 24 grouped in rows, which together form a common group of orifices 25. These are, for example, atomizers. By way of example, the spray orifices 24 are each arranged in the direction of the dispenser central axis 16 with identical longitudinal spacing from each other and in a circumferential direction 28 rotating about the dispenser central axis 16 with identical circumferential spacing from one another. This ensures that the medical product 6 inserted into the multifunctional dispenser 1 can be wetted evenly and completely, in particular over its entire surface, with cleaning-active liquids 2. The first housing part 7 that accommodates the medical product 6 can expediently be made of a transparent plastic.

FIG. 5 shows a perspective view of a preferred further exemplary embodiment of a multifunctional dispenser 1 according to the invention. As in the preceding exemplary embodiments, it is used to dispense cleaning-active liquids 2, in particular disinfectants or soap, to users. However, medical products 6 inserted inside cannot be wetted by the cleaning-active liquids 2. This multifunctional dispenser 1 can also be installed in a center console of a motor vehicle, although this is not indicated in FIGS. 5 and 6. Specifically, it is provided that the multifunctional dispenser 1 has a plastic multi-part housing 3 extending in a main direction of extension 4, in particular along a straight central axis 5, which has an integral, first pot-shaped housing part 7 suitable for receiving medical products 6, in particular hygiene products such as face masks, tissues, cleaning agents or disinfectants, and, arranged in touching contact thereon, i.e., on the first housing part 7, an integral, second pot-shaped housing part 8 suitable for receiving cleaning-active liquids 2, in particular also powders or pastes. The first housing part 7 defines in its main direction of extension 9 a straight first central axis 10 and forms a loading passage 11 for passing medical products 6 therethrough. The loading passage 11 is designed in the present case as a single-slot passage 38, although slotted, in particular slotted in the form of a cross or a star, dispensing devices are also conceivable. In this configuration, the loading passage 11 can control the dispensing of medical products 6, in particular it is suitable for passing through and dispensing at least one medical product 6 stored in the first housing part 7. In the interior of the first housing part 7, at least one single medical product 6 is inserted by way of example. The second housing part 8 defines a straight second central axis 13 in its main direction of extension 12 and stores a predefined mass or a predefined volume of cleaning-active liquid 2. By way of example, the first housing part 7 and the second housing part 8 are detachably arranged on one another, which can be achieved, for example, by a screw connection 17. Furthermore, the loading passage 11, in particular in its assembled state, is axially arranged between the first housing part 7 and the second housing part 8 in the direction of the first central axis 10 and the second central axis 13 and can be closed in a fluid-tight manner by the second housing part 8. In other words, the second housing part 8 acts like a lid for closing the loading passage 11 of the first housing part 7. The multifunctional dispenser 1 further has an actuatable liquid dispenser 14 for dispensing cleaning-active liquids 2, which is fixed on the second housing part 8, for example by screwing or injection molding. In its main direction of extension 15, the liquid dispenser 14 defines a straight dispenser central axis 16. When the liquid dispenser 14 is actuated, in particular manually, it dispenses a predefined volume or a predefined mass of cleaning-active liquid 2 from the second housing part 8 to a user. In particular, the central axis 5, the dispenser central axis 16, the first central axis 10 and the second central axis 13 are aligned parallel to each other and expediently coaxially in order to achieve the most compact possible design of the multifunctional dispenser 1. This is particularly advantageous if the first housing part 7 and the second housing part 8 are rotationally symmetrical with respect to their respective axes.

The liquid dispenser 14 has a round-cylindrical dispenser shaft 18 extending along the dispenser central axis 16 for passing through, in particular sucking in, cleaning-active liquids 2. The dispenser shaft 18 has a circular tubular body 26 with a material tubular jacket 27 that cannot be equated with its lateral surface. The dispenser shaft 18 protrudes in the direction of the dispenser central axis 16 only in sections into the second housing part 8. A knob-shaped dispenser head 19 of the liquid dispenser 14 is arranged at one end on the dispenser shaft 18, which dispenser head is accessible from outside of the housing and from which is arranged an internally hollow dispenser spout 20 projecting away at an angle, in particular at right angles, with respect to the dispenser central axis 16 and in fluid communication with the dispenser shaft 18 for dispensing cleaning-active liquids 2. Furthermore, an actuation force 21, which is indicated by a corresponding arrow in FIG. 5 and is aligned in particular parallel with respect to the dispenser central axis 16, can be introduced at the dispenser head 20, the liquid dispenser 14 being able to be actuated by means of the actuation force. As a result, cleaning-active liquid 2 can be delivered or pumped from the second housing part 8 through the dispenser shaft 18 to the dispenser spout 20 and dispensed. By way of example, a bellows 22, which creases to form several peaks in the direction of the dispenser central axis 16, is arranged between the dispenser head 19 of the liquid dispenser 14 and the housing 3.

Similar to the dispenser heads 19 of the multifunctional dispenser 1 of the preceding exemplary embodiments, the dispenser head 19 of the present multifunctional dispenser 1 is also rotatably arranged on the dispenser shaft 18. However, it can only be rotated back and forth about the dispenser central axis 16 between two different rotational positions 29. It can be seen in FIG. 5 that the dispenser head 19 is rotatably arranged on the dispenser shaft 18 or on the second housing part 8 and that the liquid dispenser 14, when the dispenser head 19 is rotated into the illustrated first one of these two rotational positions 29, referred to as locked position 30, cannot be actuated in the direction of the dispenser central axis 16, but rather is blocked against movement. As a result, the liquid dispenser 14 cannot be used to dispense cleaning-active liquid 2 via the dispenser spout 20 to the user. In this rotational position 29, the dispenser head 19 defines a reference angle position 33, for example 0° in particular. It is further indicated in FIG. 5 that when the dispenser head 19 is rotated into a second one of these rotational positions 29, referred to as dispensing position 31, the liquid dispenser 14 can be actuated in the direction of the dispenser central axis 16 by applying actuation force 21 to the dispenser head 19 in the direction of the dispenser central axis 16. As a result, by means of the liquid dispenser 14, a certain mass or a certain volume of cleaning-active liquid 2 can be delivered, in particular pumped, through the dispenser shaft 18 and dispensed to a user via the dispenser spout 20. In this rotational position 29, the dispenser head 19 defines a so-called dispensing angle position 34 that is rotated at right angles with respect to the reference angle position 33 in the angular range of 0° to +/−90°. The orifices 24 arranged on the dispenser shaft 18 act here as suction orifices.

FIG. 6 shows a perspective view of the multifunctional dispenser 1 from FIG. 5, but the two housing parts 7, 8 of the multifunctional dispenser 1 are now arranged spaced apart from each other, so that a medical product 6 can be removed from the first housing part 7 or inserted into it.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A multifunctional dispenser configured to dispense cleaning-active liquids, the multifunctional dispenser comprising:
    a multi-part housing extending in a main direction of extension and having an integral, first housing part configured to receive medical products and, arranged in contact on the first housing part, an integral, second housing part configured to receive cleaning-active liquids, wherein the first housing part defines a first central axis, has a loading passage configured to pass medical products therethrough, wherein at least one medical product is inserted through the loading passage into the first housing part, and wherein the second housing part defines a second central axis and stores cleaning-active liquid,
    an actuatable liquid dispenser configured to dispense cleaning-active liquids, the actuatable liquid dispenser defining a dispenser central axis in its main direction of extension and, when actuated, is configured to deliver and dispense a predefined volume or a predefined mass of the cleaning-active liquid from the second housing part,
    wherein the dispenser central axis, the first central axis, and the second central axis are coaxially aligned with each other, and wherein
    when manually actuated in a first position, the liquid dispenser is configured to deliver the predefined volume or the predefined mass of cleaning-active liquid from the second housing part and introduces the predefined volume or the predefined mass of cleaning-active liquid into the first housing part to wet the at least one medical product arranged therein,
    when manually actuated in a second position, the liquid dispenser is configured to deliver the predefined volume or the predefined mass of cleaning-active liquid from the second housing part and dispense the predefined volume or the predefined mass of cleaning-active liquid external to the liquid dispenser, and
    the liquid dispenser has a round-cylindrical dispenser shaft extending along the dispenser central axis, wherein the round-cylindrical dispenser shaft is configured to pass the cleaning-active liquids therethrough, wherein a knob-shaped dispenser head of the liquid dispenser is arranged at one end on the round-cylindrical dispenser shaft dispenser shaft, wherein an internally hollow dispenser spout projects away from the knob-shaped dispenser head at an angle with respect to the dispenser central axis, wherein the internally hollow dispenser spout is configured to dispense the cleaning-active liquids, and wherein the round-cylindrical dispenser shaft penetrates at least sections of the first housing part and the second housing part.

2. The multifunctional dispenser of claim 1, wherein the first housing part and the second housing part are detachably arranged on each other.

3. The multifunctional dispenser of claim 1, wherein
    the liquid dispenser is fixed in contact with the first housing part, the round-cylindrical dispenser shaft penetrates the first housing part completely and penetrates sections of the second housing part, or
    the liquid dispenser is fixed in contact with the second housing part, wherein the round-cylindrical dispenser shaft penetrates sections of the first housing part and completely penetrates the second housing part.

4. The multifunctional dispenser of claim 1, wherein the liquid dispenser has a disinfectant dispensing section arranged inside the first housing part and configured to introduce the cleaning-active liquids into the first housing part to wet the medical products arranged in the first housing part.

5. The multifunctional dispenser of claim 4, wherein the disinfectant dispensing section includes a group of orifices having a plurality of spray orifices.

6. The multifunctional dispenser of claim 5, wherein
    a basket or a grid configured to collect and grip the at least one medical product is arranged in interior of the first housing part,
    the spray orifices of the group of orifices are each an atomizer,
    the loading passage has or forms a round passage configured for manually insertion or removal of the at least one medical product into or out of the first housing part, or
    the loading passage has or forms a slotted, in a form of a cross or star, dispensing device or a single-slot passage, each of which are configured to pass therethrough and dispense the at least one medical product stored in the first housing part.

7. The multifunctional dispenser of claim 4, wherein
    the knob-shaped dispenser head is rotatably arranged on the round-cylindrical dispenser shaft and is rotatable back and forth about the dispenser central axis between at least three different rotational positions,
    the liquid dispenser is configured so that it cannot be actuated in a direction of the dispenser central axis when the dispenser head is rotated into a first one of the at least three rotational positions, wherein the first one of the at least three rotational positions is a locked position in which the dispenser head defines a reference angle position, so that the liquid dispenser is configured so it cannot be used either to introduce the cleaning-active fluid via the disinfectant dispensing section into the first housing part or to dispense the cleaning-active fluid via the dispenser spout,
    the liquid dispenser is actuatable in the direction of the dispenser central axis by applying actuation force to the dispenser head when the dispenser head is rotated into a second one of the at least three rotational positions, the second one of the at least three rotational positions is a dispensing position in which the dispenser head defines a dispensing angle position deviating in an angular range of +10° to +90° with respect to the reference angle position, so that the liquid dispenser is configured to deliver the cleaning-active liquid through the round-cylindrical dispenser shaft and dispense the cleaning-active liquid via the dispenser spout, and the liquid dispenser is actuatable in the direction of the dispenser central axis by applying actuation force to the dispenser head when the dispenser head is rotated into a third of the at least three rotational positions, wherein the third one of the at least three rotational positions is a wetting position in which the dispenser head defines a wetting angle position deviating in an angular range of −10° to −90° with respect to the reference angle position, so that the liquid dispenser is configured to pass the cleaning-active liquid from the second housing part through the dispenser shaft of the liquid dispenser to the disinfectant dispensing section and to wet the at least one medical product arranged in the first housing part.

8. The multifunctional dispenser of claim 1, wherein the loading passage, in an assembled state of the multifunctional dispenser, is axially arranged in a direction of the first and second central axes between the first housing part and the second housing part, and the loading passage in the assembled state of the multifunctional dispenser is closable or closed by the second housing part.

9. The multifunctional dispenser of claim 1, wherein the first or second housing part is integrated into a center console of a motor vehicle.

* * * * *